United States Patent
Baek et al.

(10) Patent No.: US 11,419,107 B2
(45) Date of Patent: Aug. 16, 2022

(54) METHOD AND APPARATUS FOR SETTING UP RADIO BEARER IN WIRELESS COMMUNICATION SYSTEM

(71) Applicant: Samsung Electronics Co., Ltd., Suwon-si (KR)

(72) Inventors: Sangkyu Baek, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 17/002,362

(22) Filed: Aug. 25, 2020

(65) Prior Publication Data
US 2021/0068091 A1    Mar. 4, 2021

(30) Foreign Application Priority Data

Aug. 26, 2019  (KR) .......................... 10-2019-0104648

(51) Int. Cl.
*H04W 72/04*  (2009.01)
*G16Y 10/75*  (2020.01)
*H04W 4/40*  (2018.01)

(52) U.S. Cl.
CPC ........... *H04W 72/044* (2013.01); *G16Y 10/75* (2020.01); *H04W 4/40* (2018.02)

(58) Field of Classification Search
CPC .. G16Y 10/75; H04W 4/40–48; H04W 40/24; H04W 48/08–14; H04W 64/003; H04W 72/044; H04W 72/23; H04W 76/00; H04W 76/14; H04W 84/18
See application file for complete search history.

(56) References Cited

U.S. PATENT DOCUMENTS

| | | | |
|---|---|---|---|
| 10,681,691 B1* | 6/2020 | Alasti | H04W 72/1215 |
| 10,736,013 B2* | 8/2020 | Zhang | H04W 36/32 |
| 2013/0303081 A1 | 11/2013 | Chang et al. | |
| 2017/0251391 A1 | 8/2017 | Kinthada Venkata et al. | |
| 2019/0166533 A1 | 5/2019 | Li et al. | |
| 2019/0246442 A1 | 8/2019 | Park et al. | |

FOREIGN PATENT DOCUMENTS

CN   107532911 B   * 11/2020   ............... A61B 5/11
WO   2013/064400 A1   5/2013

OTHER PUBLICATIONS

"3rd Generation Partnership Project; Technical Specification Group Access Network; NR; Radio Link Control (RLC) protocol specification (Release 15)," 3GPP TS 38.322 V1 5.5.0; https://portal.3gpp.org/desktopmodules/Specifications/SpecificationDetails.aspx?specificationId=3195; pub. Apr. 9, 2019 (Year: 2019).*

Notification of Transmittal of the International Search Report and the Written Opinion of the International Searching Authority, or the Declaration dated Nov. 25, 2020 in connection with International Patent Application No. PCT/KR2020/011423, 10 pages.

* cited by examiner

*Primary Examiner* — Thomas R Cairns

(57) ABSTRACT

A method, performed by a terminal, of performing vehicle-to-everything (V2X) communication includes: applying, to a sidelink radio bearer, first configuration information; receiving second configuration information according to a movement of the terminal; determining a time point at which the second configuration information is to be applied; and changing, based on the time point and the second configuration information, a configuration of the sidelink radio bearer.

16 Claims, 16 Drawing Sheets

METHOD AND APPARATUS FOR SETTING UP RADIO BEARER IN WIRELESS COMMUNICATION SYSTEM

CROSS-REFERENCE TO RELATED APPLICATION

This application is based on and claims priority under 35 U.S.C. § 119 to Korean Patent Application No. 10-2019-0104648, filed on Aug. 26, 2019, in the Korean Intellectual Property Office, the disclosure of which is incorporated by reference herein in its entirety.

BACKGROUND

1. Field

The disclosure relates to a method and apparatus for setting up a radio bearer in a wireless communication system.

2. Description of the Related Art

In order to meet the increasing demand with respect to wireless data traffic after the commercialization of 4G communication systems, efforts have been made to develop improved 5G communication systems or pre-5G communication systems. For this reason, 5G communication systems or pre-5G communication systems are called Beyond 4G network communication systems or Post LTE systems. In order to achieve a high data rate, consideration is given to implementing 5G communication systems in millimeter wave (mmW) frequency bands (e.g., 80 GHz bands). In order to reduce propagation path loss of radio waves and increase a propagation distance of radio waves in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent Internet Technology (IT) service for collecting and analyzing data generated by connected things and creating a new value in people's lives may be provided. IoT is applicable to various fields, such as smart homes, smart buildings, smart cities, smart cars or connected cars, smart grids, health care, smart home appliances, and advanced medical care, via fusion and combination of existing information technology (IT) with various industries.

Accordingly, various attempts are being made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of 3eG technology and IoT technology.

Because wireless communication systems are able to provide various services due to the developments of the above wireless communication systems, methods of smoothly providing the services by using packet duplicate transmission are required, in particular, by wireless communication systems.

SUMMARY

Provided is a method and apparatus capable of effectively supporting services in a wireless communication system.

Additional aspects will be set forth in part in the description which follows and, in part, will be apparent from the description, or may be learned by practice of the presented embodiments of the disclosure.

According to an embodiment of the disclosure, a method, performed by a terminal, of performing vehicle-to-everything (V2X) communication includes: applying, to a sidelink radio bearer, first configuration information; receiving second configuration information according to a movement of the terminal; determining a time point at which the second configuration information is to be applied; and changing, based on the time point and the second configuration information, a configuration of the sidelink radio bearer.

The time point may be a time point at which a maxRetxThreshold included in the first configuration information is changed to a maxRetxThreshold included in the second configuration information.

The method may further include: retransmitting, based on the first configuration information, one or more radio link control protocol data units (RLC PDUs); and in case that the number of retransmission of the one or more RLC PDUs is greater than or equal to the maxRetxThreshold included in the second configuration information, reporting, to a higher layer, the determining result.

The time point may be a time point at which a service data association protocol (SDAP) layer, a packet data convergence protocol (PDCP) layer, a radio link control (RLC) layer, or a medium access control (MAC) layer is released.

The changing of the configuration of the sidelink radio bearer may further include changing a configuration associated with a length of a sequence number at the time point.

The time point may be a time point at which a timer expires, restarts, or stops, and the timer may be at least one of a reordering timer, a reassembly timer, or poll retransmit timer.

The time point may be a time point at which a state variable value is reset or changed to an initial value, and the state variable value may be associated with a pollPDU or pollByte.

The method may further include transmitting, to another terminal, information indicating that the configuration of the sidelink radio bearer has been changed.

According to an embodiment of the disclosure, a terminal for performing vehicle-to-everything (V2X) communication includes: a transceiver; and at least one processor connected with the transceiver and configured to apply, to a sidelink radio bearer, first configuration information, receive second configuration information according to a movement of the terminal, determine a time point at which the second configuration information is to be applied, and change, based on the time point and the second configuration information, a configuration of the sidelink radio bearer.

The time point may be a time point at which a maxRetx-Threshold included in the first configuration information is changed to a maxRetxThreshold included in the second configuration information.

The at least one processor may be further configured to: retransmit, based on the first configuration information, one or more radio link control protocol data units (RLC PDUs) and in case that the number of retransmission of the RLC PDUs is greater than or equal to the maxRetxThreshold included in the second configuration information, reporting, to a higher layer, the determining result.

The time point may be a time point at which a service data association protocol (SDAP) layer, a packet data convergence protocol (PDCP) layer, a radio link control (RLC) layer, or a medium access control (MAC) layer is released.

The at least one processor may be further configured to change a configuration associated with a length of a sequence number at the time point.

The time point may be a time point at which a timer expires, restarts, or stops, and the timer may be at least one of a reordering timer, a reassembly timer, or poll retransmit timer.

The time point may be a time point at which a state variable value is reset or changed to an initial value, and the state variable value may be associated with a pollPDU or pollByte.

The at least one processor is further configured to transmit, to another terminal, information indicating that the configuration of the sidelink radio bearer has been changed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
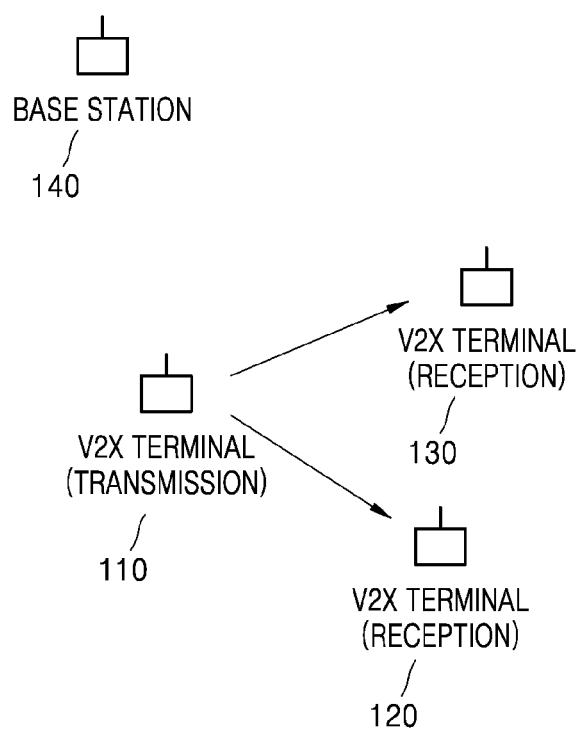
FIG. 1 illustrates a scenario of performing inter-terminal communication in Vehicle-to-Everything (V2X) communication, according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the disclosure. As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a base station is a subject that performs resource allocation of a terminal, and may be at least one of gNode B, eNode B, Node B, base station (BS), a radio access unit, a base station controller, or a node on a network. Examples of a terminal may include a user equipment (UE), a mobile station (MS), a cellular phone, a smartphone, a computer, and a multimedia system capable of performing a communication function. Furthermore, the term 'terminal' may refer to a mobile phone, NB-IoT devices, sensors, and other wireless communication devices. Of course, a base station and a terminal are not limited to the above examples.

Hereinafter, for convenience of description, the disclosure uses terms and names defined in the 3rd Generation Partnership Project Long Term Evolution (3GPP LTE) standard and/or the 3rd Generation Partnership Project New Radio (NR) standard. However, the disclosure is not limited to the aforementioned terms and names.

Although embodiments of the disclosure are hereinafter described with respect to an LTE, LTE-Advanced (LTE-A), LTE Pro, or 5G (or NR as next-generation mobile communication) system, the embodiments of the disclosure may be applied to other communication systems having similar technical backgrounds and channel configurations. Furthermore, it should be understood by those skilled in the art that the embodiments of the disclosure are applicable to other communication systems though modifications not departing from the scope of the disclosure.

Embodiments of the disclosure will now be described more fully with reference to the accompanying drawings, in which exemplary embodiments are shown.

FIG. 1 illustrates a scenario of performing inter-terminal communication in Vehicular to Everything (V2X) communication, according to an embodiment of the disclosure.

In detail, referring to FIG. 1, it is assumed that V2X terminals 110, 120, and 130 communicate with one another without using base stations in V2X communication. This transmission method may be one of the following three methods.

Unicast: One-to-one communication between a transmission terminal and a reception terminal Multicast: One-to-many communication between a transmission terminal and multiple reception terminals Broadcast: One-to-many communication between a transmission terminal and multiple unspecified reception terminals Which of the above-described three methods is used for transmission may be determined according to characteristics of traffic to be transmitted or characteristics of a V2X terminal that performs transmission/reception. According to an embodiment of the disclosure, a base station may determine a transmission method and may transmit the determined transmission method to a terminal via Radio Resource Control (RRC) configuration. Because this V2X communication is based on communication between terminals, the V2X communication may be performed in a connected mode within the coverage of a base station, but may be performed in an idle mode or inactive mode where connection with a base station has been released. When a terminal has a link state capable of performing V2X communication even in an out-of-coverage (OOC) state of a base station, V2X communication is possible. When the Unicast method is used, it may be assumed that two V2X terminals transmit and receive data, and a transmission terminal, a reception terminal, and configuration values, such as a parameter and a timer, to be used in Unicast communication may be set using several methods. V2X communication is referred to as a sidelink, because communication is performed between terminals without using a base station. A radio bearer in a sidelink on which a terminal performs communication is referred to as a SideLink Radio Bearer (SLRB).

To support V2X communication regardless of a transmission method, the V2X terminal 110 in charge of transmission may transmit data for V2X communication to one or more reception V2X terminals 120 and 130. At this time, only terminals allowed to receive data transmitted by the V2X terminal 110 in charge of transmission may receive the data. When V2X communication is performed within the coverage of a base station 140, the base station 140 may control the V2X communication. A role that may be performed by the base station 140 may be at least one of RRC connection configuration, allocation of radio resources (frequency and time resources), transmission method configuration, radio bearer setup, or a Quality of Service (QoS).

Figure 2:
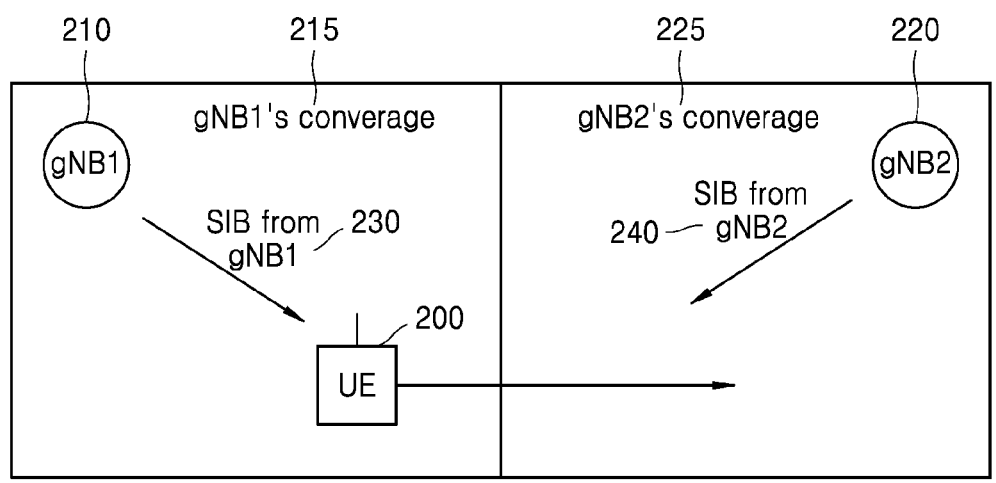
FIG. 2 illustrates a mobility scenario of a transmission/reception terminal in V2X communication, according to an embodiment of the disclosure.

FIG. 2 illustrates a mobility scenario of a transmission/reception terminal in V2X communication, according to an embodiment of the disclosure.

A terminal 200 having mobility may deviate from a coverage 215 of a serving base station (gNB1) 210 that is a base station to which the terminal 200 belongs, and may move to a coverage 225 of another base station 220 or to an OOC region that is not the coverage of any base station. At this time, the terminal 200 may be configured through an RRC Configuration or Reconfiguration message of the base station to which the terminal 200 belongs. However, when the terminal 200 is in an RRC idle mode or inactive mode, the terminal 200 may receive configuration information of the terminal 200 by a system information block (SIB) that is received from the base station. Even when the terminal 200 is in a connected mode, configuration of V2X communication or an SLRB may be configured based on the SIB. When the terminal 200 moves to the OOC region that is not the coverage of any base station, configuration of V2X communication or an SLRB may be applied based on pre-configuration used in the OOC.

According to the embodiment of FIG. 2, the terminal 200 is initially located in the coverage 215 of a first base station (gNB1) 210. When the terminal 200 exists in the coverage 215 of the first base station 210, the terminal 200 may apply configuration information of V2X communication or an SLRB included in an SIB 230 transmitted by the first base station 210. Thereafter, the terminal 200 may move to the coverage 225 of a second base station 220 and may receive an SIB 240 from the second base station 220. At this time, because the terminal 200 is located in the coverage 225 of the second base station 220, the terminal 200 needs to apply, to the terminal 200, configuration included in the SIB 240 transmitted by the second base station 220. In particular, when pre-configured current configuration of V2X communication or an SLRB is different from the configuration included in the SIB 240 transmitted by the second base station 220, there is a need to prevent an operational error due to the difference. This scenario is not limited to V2X terminals but is equally applicable to terminals in an idle mode or inactive mode that do not receive direct configuration from a base station or to general terminals that operate in an OOC region. A time point when it is determined that the terminal 200 has moved to the coverage 225 of the second base station 220 may be a time point when the terminal 200 is no longer able to receive the SIB 230 transmitted by the first base station 210, or may be a time point when a signal intensity received by the terminal 200 from the first base station 210 is lower than a sum of a signal intensity received by the terminal 200 from the second base station 220 and a certain constant.

Figure 3:
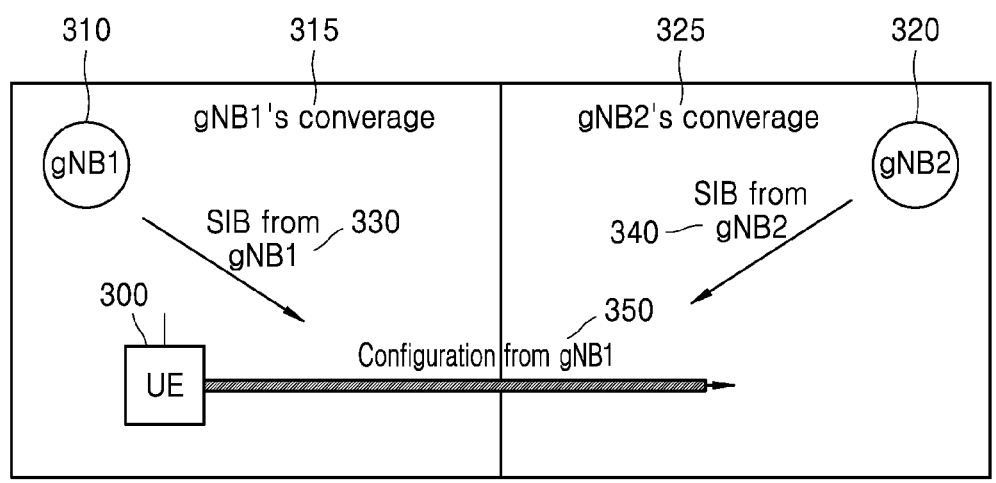
FIG. 3 illustrates a reconfiguration method of V2X communication or a SideLink Radio Bearer (SLRB) in a mobility scenario of a V2X communication terminal, according to an embodiment of the disclosure.

FIG. 3 illustrates a reconfiguration method of V2X communication or an SLRB in a mobility scenario of a terminal of V2X communication, according to an embodiment of the disclosure.

A terminal 300 having mobility may deviate from a coverage 315 of a serving base station 310 that is a base station 310 to which the terminal 300 belongs, and may move to a coverage 325 of another base station 320 or to an OOC region that is not the coverage of any base station. When the terminal 300 is in an RRC idle mode or inactive mode, the terminal 300 may receive configuration information of the terminal 300 from an SIB that is received from the base station. Even when the terminal 300 is in a connected mode, V2X communication or an SLRB may be configured based on the SIB. When the terminal 300 moves to the OOC region that is not the coverage of any base station, configuration of V2X communication or an SLRB may be applied based on pre-configuration used in the OOC. However, a time point at which a configuration or pre-configuration is to be applied when a terminal has moved to a base station, and what information is to be applied, may vary according to embodiments.

According to the embodiment of FIG. 3, the terminal 300 may be initially located in the coverage 315 of a first base station (gNB1) 310. When the terminal 300 exists in the coverage 315 of the first base station 310, the terminal 300 may apply, to the terminal 300, configuration information of V2X communication or an SLRB included in an SIB 330 transmitted by the first base station 310. Thereafter, the terminal 300 may move to the coverage 325 of a second base station 320 and may receive an SIB 340 from the second base station 320. At this time, because the terminal 300 is located in the coverage 325 of the second base station 320, the terminal 300 needs to apply, to the terminal 300, configuration included in the SIB 340 transmitted by the second base station 220. In particular, when pre-configured current configuration of V2X communication or an SLRB is different from the configuration included in the SIB 340 transmitted by the second base station 320, an operational error due to the difference needs to be prevented. According to the embodiment of FIG. 3, the terminal 300 may apply the configuration included in the SIB 330 transmitted by the first base station 310 at the moment when V2X communication or an SLRB is set up, and may maintain the configuration until the V2X communication or the SLRB is re-established or released. Thus, even when the terminal 300 moves to the coverage 325 of the second base station 320, the terminal 300 may maintain the existing configuration of the V2X communication or the SLRB without changes, and may apply the configuration included in the SIB 340 transmitted by the second base station 320 for only a configuration value of V2X communication or an SLRB that is newly configured.

This scenario is not limited to V2X terminals but is equally applicable to terminals in an idle mode or inactive mode that do not receive direct configuration from a base station or to general terminals that operate in an OOC region. The above-described configuration method does not need to be applied to configurations of all V2X communications or configurations of all SLRBs, and may be applied to only some state variables or some timer values.

Figure 4:
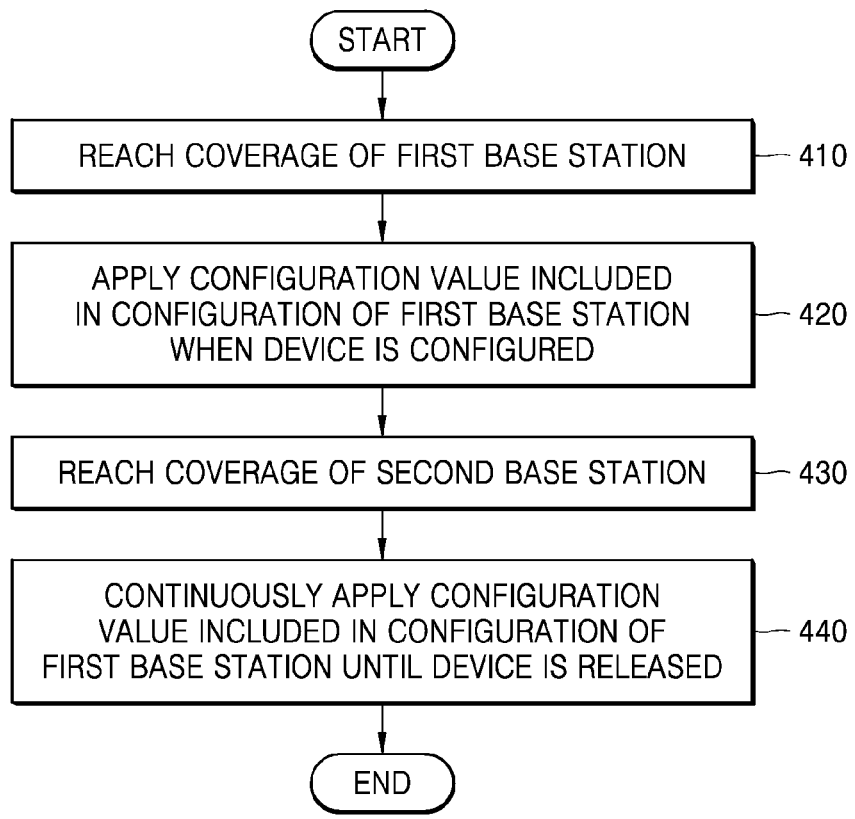
FIG. 4 is a flowchart of an operation of reconfiguring V2X communication or an SLRB, in a mobility scenario of a V2X communication terminal, according to an embodiment of the disclosure.

FIG. 4 is a flowchart of an operation of reconfiguring V2X communication or an SLRB, in a mobility scenario of a terminal of V2X communication, according to an embodiment of the disclosure.

When a terminal reaches the coverage of a first base station and is able to receive an SIB from the first base station (operation 410), the terminal may apply a configuration value included in configuration of the first base station when either V2X communication or an SLRB and Packet Data Convergence Protocol (PDCP), Radio Link Control (RLC), Service Data Adaptation Protocol (SDAP), and Medium Access Control (MAC) devices of the SLRB are configured (operation 420). Thereafter, when the terminal reaches the coverage of a second base station and is able to receive an SIB from the second base station (operation 430), the terminal may continuously apply the configuration value due to configuration of the first base station until the pre-configured V2X communication or SLRB and the pre-configured PDCP, RLC, SDAP, and MAC devices of the SLRB are released, and may apply a configuration value included in configuration of the second base station for only V2X communication or an SLRB to be newly configured and the PDCP, RLC, SDAP, and MAC devices of the SLRB (operation 440).

Figure 5:
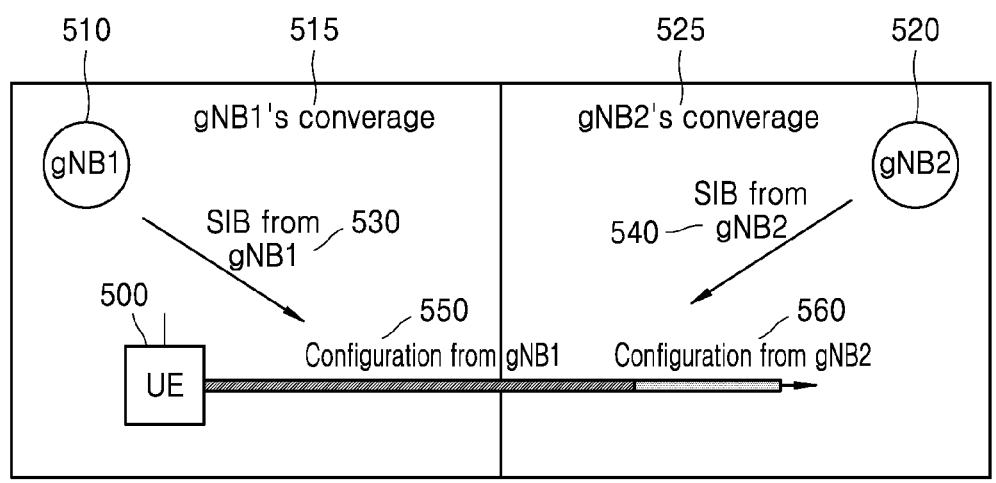
FIG. 5 illustrates a reconfiguration method of V2X communication or an SLRB in a mobility scenario of a V2X communication terminal, according to an embodiment of the disclosure.

FIG. 5 illustrates a reconfiguration method of V2X communication or an SLRB in a mobility scenario of a terminal of V2X communication, according to an embodiment of the disclosure.

A terminal 500 having mobility may deviate from a coverage 515 of a serving base station 510 that is a base station to which the terminal 500 belongs, and may move to a coverage 525 of another base station 520 or to an OCC region that is not the coverage of any base station. When the terminal 500 is in an RRC idle mode or inactive mode, the terminal 500 may receive configuration information of the terminal 500 from an SIB that is received from the base station. Even when the terminal 500 is in a connected mode, V2X communication or an SLRB may be configured based on the SIB. When the terminal 500 moves to the OOC region that is not the coverage of any base station, configuration of V2X communication or an SLRB may be applied based on pre-configuration used in the OCC. However, a time point at which a configuration or pre-configuration is to be applied when a terminal has moved to a base station, and what information is to be applied, may vary according to embodiments.

According to the embodiment of FIG. 5, the terminal 500 is initially located in the coverage 515 of a first base station (gNB1) 510. When the terminal 500 exists in the coverage 515 of the first base station 510, the terminal 500 may apply, to the terminal 500, configuration information of V2X communication or an SLRB included in an SIB 530 transmitted by the first base station 510. Thereafter, the terminal 500 may move to the coverage 525 of a second base station 520 and may receive an SIB 540 from the second base station 520. At this time, because the terminal 500 is located in the coverage 525 of the second base station 520, the terminal 500 needs to apply, to the terminal 500, configuration included in the SIB 540 transmitted by the second base station 520. In particular, when pre-configured current configuration of V2X communication or an SLRB is different from the configuration included in the SIB 540 transmitted by the second base station 520, an operational error due to the difference needs to be prevented. According to the embodiment of FIG. 5, it is assumed that, at the moment when V2X communication or an SLRB is configured, the terminal 500 applies the configuration included in the SIB 530 transmitted by the first base station 510, and, when the terminal 500 has moved to the coverage 525 of the second base station 520, a pre-set value is maintained without changes for a certain time period (operation 550). When the corresponding configuration is a timer and the timer expires, restarts, is reset, or stops, the terminal 500 may apply, to the terminal 500, the configuration included in the SIB 540 transmitted by the second base station 520. For example, the timer may be one or more of a reordering timer, a reassembly timer, and a poll retransmit timer. When the corresponding configuration is a constant value corresponding to a state variable and the state variable value is reset or changed to an initial value, the terminal 500 may apply, to the terminal 500, the configuration included in the SIB 540 transmitted by the second base station 520. For example, the constant value may correspond to at least one of a sequence number length, a maximum retransmission threshold (maxRetxThreshold), pollPDU, and a pollByte value (operation 560).

This scenario is not limited to V2X terminals but is equally applicable to terminals in an idle mode or inactive mode that do not receive direct configuration from a base station or to general terminals that operate in an OOC region. The above-described configuration method does not need to be applied to configurations of all V2X communications or configurations of all SLRBs, and may be applied to only some state variables or some timer values.

Figure 6:
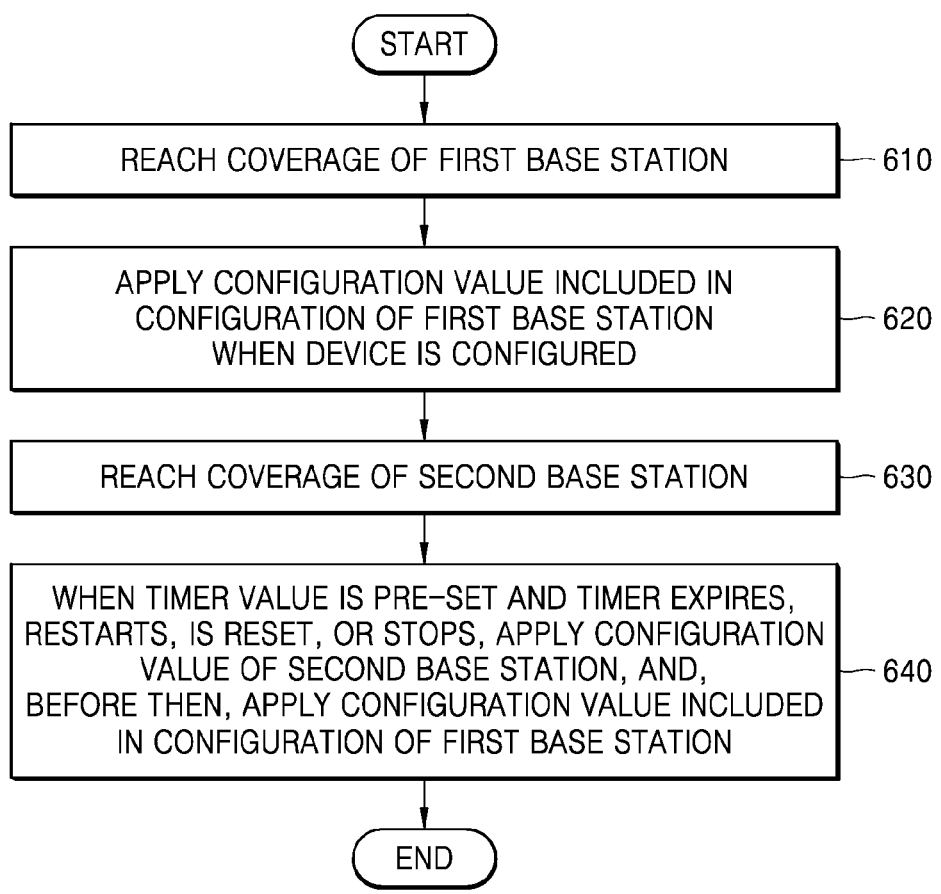
FIG. 6 is a flowchart of an operation of reconfiguring V2X communication or an SLRB, in a mobility scenario of a V2X communication terminal, according to an embodiment of the disclosure.

FIG. 6 is a flowchart of an operation of reconfiguring V2X communication or an SLRB, in a mobility scenario of a terminal of V2X communication, according to an embodiment of the disclosure.

When a terminal reaches the coverage of a first base station and is able to receive an SIB from the first base station (operation 610), the terminal may apply a configuration value included in configuration of the first base station when either V2X communication or an SLRB and PDCP, RLC, SDAP, and MAC devices of the SLRB are configured (operation 620). Thereafter, the terminal moves and reaches the coverage of a second base station and is able to receive an SIB transmitted by the second base station (operation 630). In this case, when the timer expires, restarts, is reset, or stops, a pre-set timer value of V2X communication or an SLRB and a timer value of the PDCP, RLC, SDAP, and MAC devices of the SLRB may be changed to configuration included in the SIB transmitted by the second base station. Before then, a configuration value based on configuration by the first base station may be applied without changes (operation 640). For example, the timer may be one or more of a reordering timer, a reassembly timer, and a poll retransmit timer.

Figure 7:
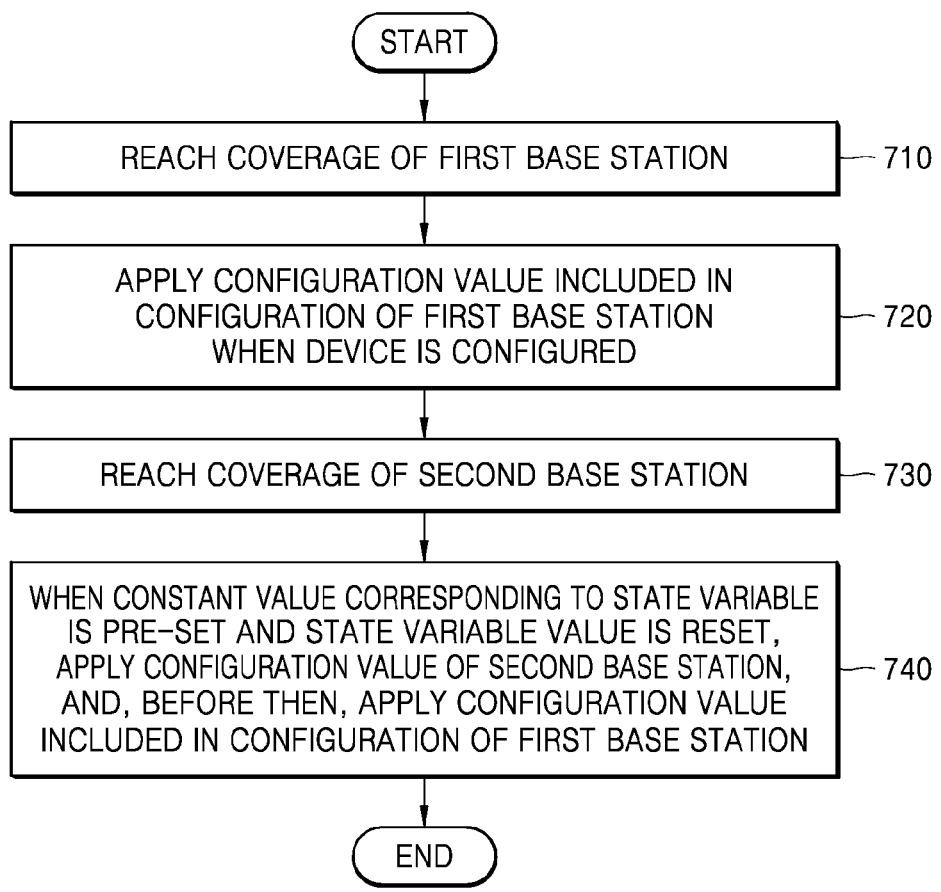
FIG. 7 is a flowchart of an operation of reconfiguring V2X communication or an SLRB, in a mobility scenario of a V2X communication terminal, according to an embodiment of the disclosure.

FIG. 7 is a flowchart of an operation of reconfiguring V2X communication or an SLRB, in a mobility scenario of a terminal of V2X communication, according to an embodiment of the disclosure.

When a terminal reaches the coverage of a first base station and is able to receive an SIB from the first base station (operation 710), the terminal may apply a configuration value included in configuration of the first base station when either V2X communication or an SLRB and PDCP, RLC, SDAP, and MAC devices of the SLRB are configured (operation 720). Thereafter, the terminal moves and reaches the coverage of a second base station and is able to receive an SIB transmitted by the second base station (operation 730). In this case, when a constant value corresponding to a state variable configured in either V2X communication or an SLRB and the PDCP, RLC, SDAP, and MAC devices of the SLRB are pre-set and the state variable value is reset or changed to an initial value, configuration included in the SIB transmitted by the second base station may be applied. Before then, a configuration value based on configuration by the first base station may be applied without changes (operation 740). For example, the constant value may correspond to at least one of a sequence number length, a maximum retransmission threshold (maxRetxThreshold), pollPDU, and a pollByte value FIG. 8 illustrates a reconfiguration method of V2X communication or an SLRB in a mobility scenario of a terminal of V2X communication, according to an embodiment of the disclosure.

A terminal 800 having mobility may deviate from a coverage 815 of a serving base station that is a base station 810 to which the terminal 800 belongs, and may move to a coverage 825 of another base station 820 or to an OCC region that is not the coverage of any base station. When the terminal 800 is in an RRC idle mode or inactive mode, the terminal 800 may receive configuration information of the terminal 800 from an SIB that is received from the base station. Even when the terminal 800 is in a connected mode, V2X communication or an SLRB may be configured based on the SIB. When the terminal 800 moves to the OOC region that is not the coverage of any base station, configuration of V2X communication or an SLRB may be applied based on pre-configuration used in the OCC. However, a time point at which a configuration or pre-configuration is to be applied when a terminal has moved to a base station, and what information is to be applied, may vary according to embodiments.

Figure 8:
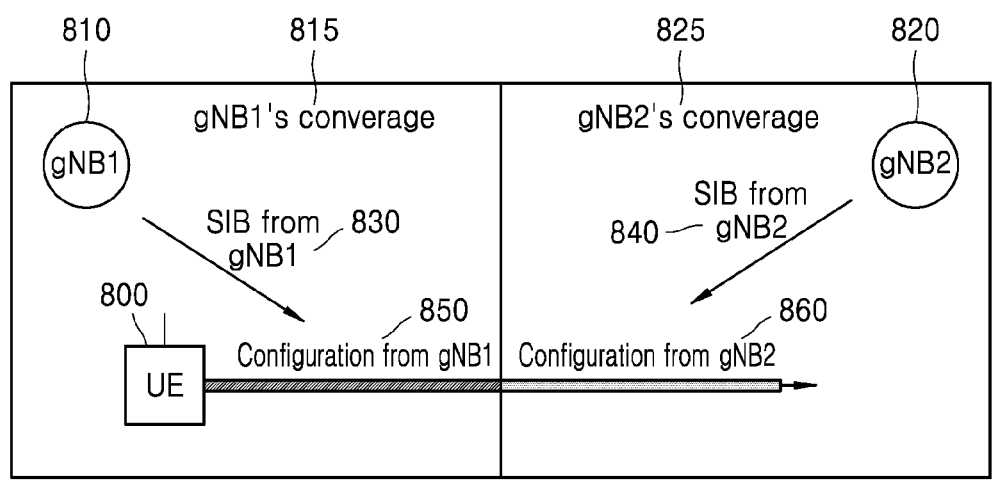
FIG. 8 illustrates a reconfiguration method of V2X communication or an SLRB in a mobility scenario of a V2X communication terminal, according to an embodiment of the disclosure.

According to the embodiment of FIG. 8, the terminal 800 is initially located in the coverage 815 of a first base station (gNB1) 810. When the terminal 800 exists in the coverage 815 of the first base station 810, the terminal 800 may apply, to the terminal 800, configuration information of V2X communication or an SLRB included in an SIB 830 transmitted by the first base station 810 (operation 850). Thereafter, the terminal 80 may move to the coverage 825 of a second base station 820 and may receive an SIB 840 from the second base station 820. At this time, because the terminal 800 is located in the coverage 825 of the second base station 820, the terminal 800 needs to apply, to the terminal 800, configuration included in the SIB 840 transmitted by the second base station 820. In particular, when pre-configured current configuration of V2X communication or an SLRB is different from the configuration included in the SIB 840 transmitted by the second base station 820, an operational error due to the difference needs to be prevented. According to the embodiment of FIG. 8, it is assumed that, at a time point when V2X communication or an SLRB is configured, configuration included in an SIB 830 transmitted by the first base station 810 is applied, and, when the terminal 800 moves to the coverage 825 of the second base station 820, a configuration value of the second base station 820 is immediately applied (operation 860). When the corresponding configuration is a timer, a running timer may stop and a new configuration value may be applied to the timer such that the timer may restart. For example, the timer performing the above-described operation may be one or more of a reordering timer, a reassembly timer, and a poll retransmit timer. When the corresponding configuration is a constant value corresponding to a state variable, the terminal 800 may reset the state variable value or change the state variable value to an initial value and may immediately apply a new configuration value. For example, the constant value may correspond to at least one of a maximum retransmission threshold (maxRetxThreshold), pollPDU, and a pollByte value.

This scenario is not limited to V2X terminals but is equally applicable to terminals in an idle mode or inactive mode where the terminals do not receive direct configuration from a base station or to general terminals that operate in an OOC region. The above-described configuration method does not need to be applied to configurations of all V2X communications or configurations of all SLRBs, and may be applied to only some state variables or some timer values.

Figure 9:
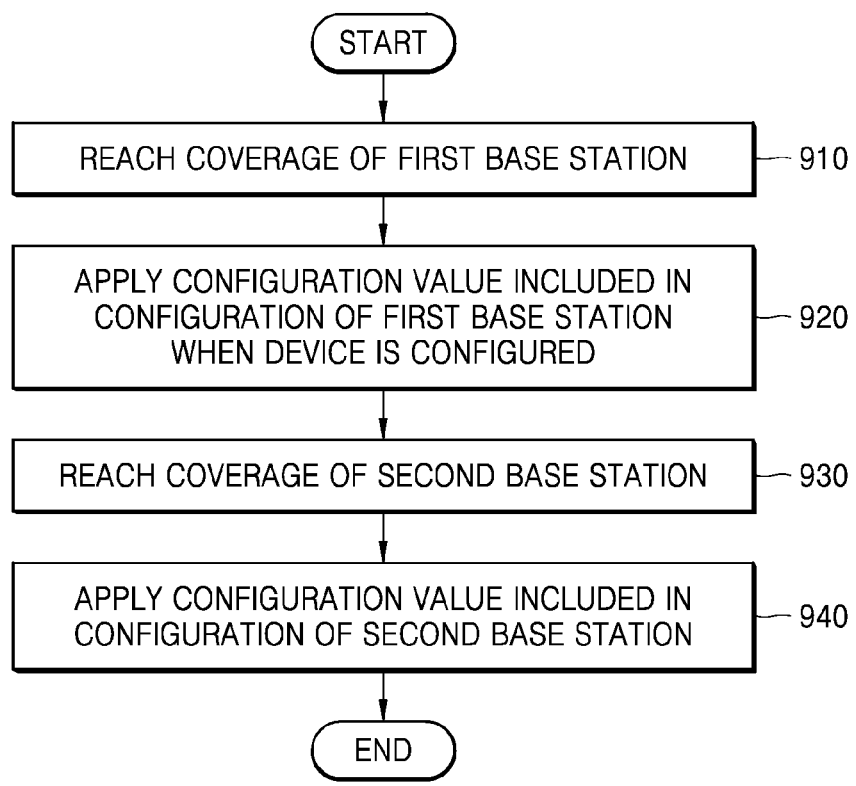
FIG. 9 is a flowchart of an operation of reconfiguring V2X communication or an SLRB, in a mobility scenario of a V2X communication terminal, according to an embodiment of the disclosure.

FIG. 9 is a flowchart of an operation of reconfiguring V2X communication or an SLRB, in a mobility scenario of a terminal of V2X communication, according to an embodiment of the disclosure.

When a terminal reaches the coverage of a first base station and is able to receive an SIB from the first base station (operation 910), the terminal may apply a configuration value included in configuration of the first base station when either V2X communication or an SLRB and the PDCP, RLC, SDAP, and MAC devices of the SLRB are configured (operation 920). Thereafter, when the terminal reaches the coverage of a second base station and is able to receive an SIB from the second base station (operation 930), the terminal may apply a configuration value included in configuration of the second base station so as to change configuration values of either V2X communication or an SLRB and PDCP, RLC, SDAP, and MAC devices of the SLRB (operation 940).

Figure 10:
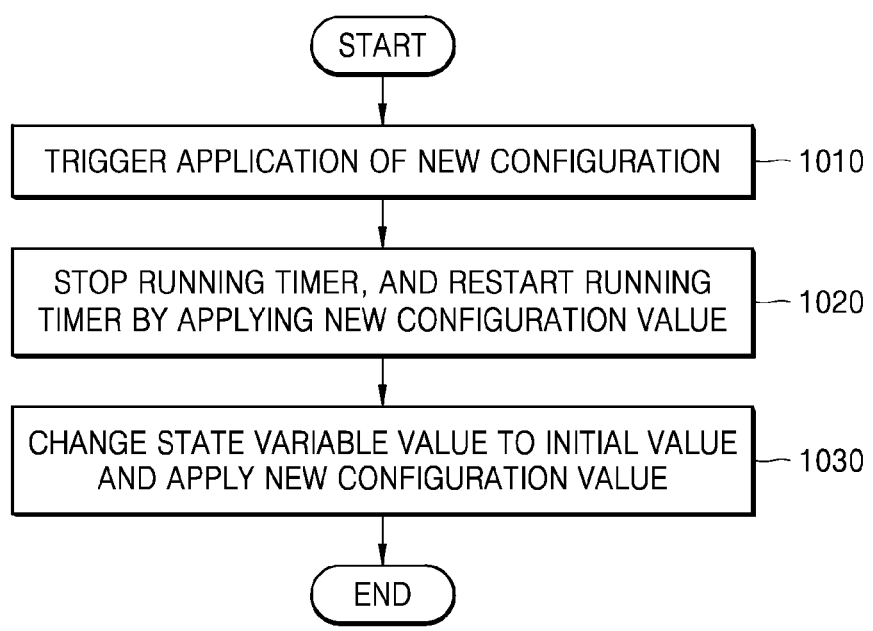
FIG. 10 is a flowchart of an operation of applying a reconfiguration value of V2X communication or an SLRB, in a mobility scenario of a V2X communication terminal, according to an embodiment of the disclosure.

FIG. 10 is a flowchart of an operation of applying a reconfiguration value of V2X communication or an SLRB, in a mobility scenario of a terminal of V2X communication, according to an embodiment of the disclosure.

Figure 11:
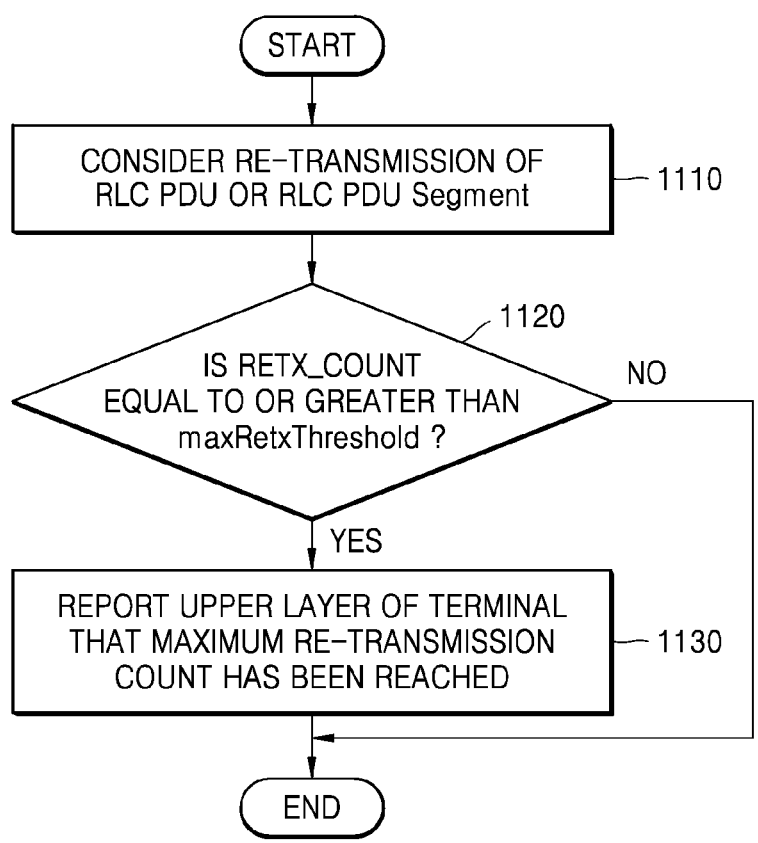
FIG. 11 is a flowchart of an operation of applying reconfiguration of a maximum retransmit threshold of an SLRB, in a mobility scenario of a V2X communication terminal, according to an embodiment of the disclosure.

A terminal having mobility is triggered to apply a new configuration, due to causes such as the terminal moving to the coverage of another base station or to an OOC region (operation 1010). When there is a running timer, the running timer may stop, and may restart by applying a new configuration value (operation 1020). For example, the timer performing the above-described operation may be one or more of a reordering timer, a reassembly timer, and a poll retransmit timer. When the corresponding configuration is applied to a constant value corresponding to a state variable, the terminal may reset the state variable value or change the state variable value to an initial value and may apply a new configuration value (operation 1030). For example, the constant value may correspond to at least one of a maximum retransmission threshold (maxRetxThreshold), pollPDU, and a pollByte value FIG. 11 is a flowchart of an operation of applying reconfiguration of maxRetxThreshold of an SLRB, in a mobility scenario of a terminal of V2X communication, according to an embodiment of the disclosure.

A terminal having mobility is triggered to apply a new configuration, due to causes such as the terminal moving to the coverage of another base station or to an OOC region. The new configuration may include a change in the maxRetxThreshold. When the maxRetxThreshold to be newly applied is less than an existing value, a case where a RETX_COUNT value is larger than the maxRetxThreshold may occur. For example, an existing configuration value of the maxRetxThreshold is 8 and the RETX_COUNT value is 5, but a newly set maxRetxThreshold value may be 4. At this time, a case where the RETX_COUNT value has already exceeded the maxRetxThreshold may occur. To prevent this, re-transmission of RLC PDU or RLC PDU Segment may be considered (operation 1110). At this time, it may be determined whether the RETX_COUNT is equal to or greater than the maxRetxThreshold (operation 1120). When the RETX_COUNT is equal to or greater than the maxRetxThreshold, an RLC layer of the terminal may report an upper layer of the terminal that a maximum re-transmission count has been reached (operation 1130). The upper layer may be an RRC layer of the terminal. Thereafter, the RRC layer of the terminal may announce a radio link failure (RLF) or an RLC failure.

According to another embodiment, when a configuration value that the terminal is to apply has been changed, it may be determined whether the RETX_COUNT value is equal to or greater than a changed maxRetxThreshold (operation 1140). When the RETX_COUNT value is equal to or greater than the maxRetxThreshold, the RLC layer of the terminal may report the upper layer of the terminal that the maximum re-transmission count has been reached (operation 1130). The upper layer may be an RRC layer of the terminal. Thereafter, the RRC layer of the terminal may announce an RLF or an RLC failure.

Figure 12:
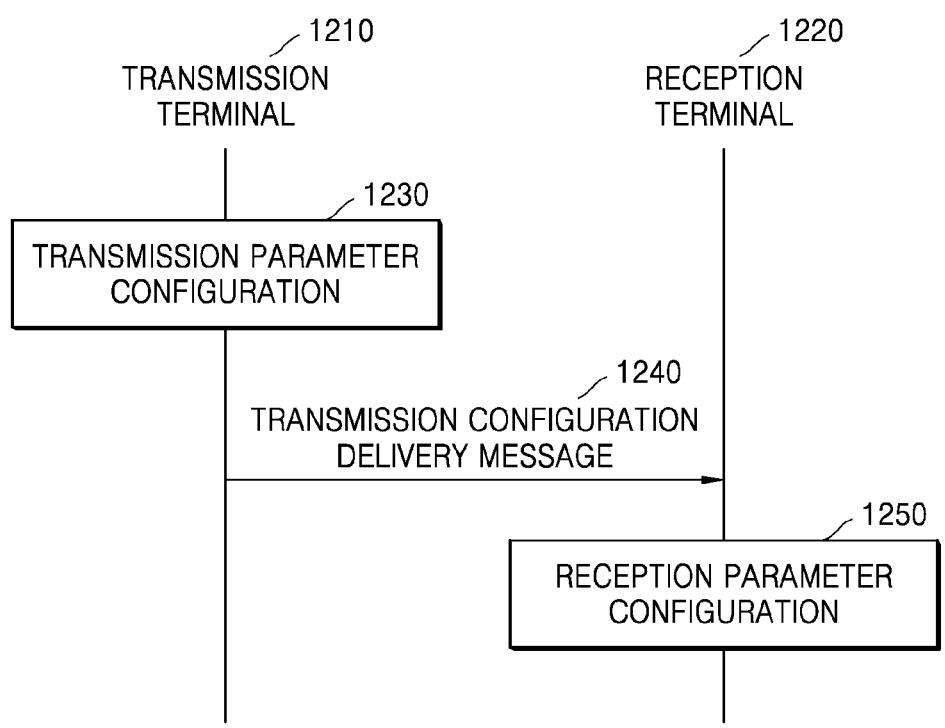
FIG. 12 is a flowchart of a procedure of applying a reconfiguration value of V2X communication or an SLRB, in a mobility scenario of a V2X communication terminal, according to an embodiment of the disclosure.

FIG. 12 is a flowchart of a procedure of applying a reconfiguration value of V2X communication or an SLRB, in a mobility scenario of a terminal of V2X communication, according to an embodiment of the disclosure.

A terminal having mobility is triggered to apply a new configuration, due to causes such as the terminal moving to the coverage of another base station or to an OOC region. The application of new configuration may be triggered in a transmission terminal 1210 or may be triggered in a reception terminal 1220. The embodiment of FIG. 12 illustrates a case where application of new configuration is triggered in the transmission terminal 1210. When application of new configuration is trigged in the transmission terminal 1210, the transmission terminal 1210 applies configuration information of V2X communication or an SLRB included in an SIB or pre-configuration transmitted by a base station. The application of the configuration information may refer to configuration of a transmission parameter value that the transmission terminal 1210 is to apply (operation 1230). Thereafter, because parameter configuration of the reception terminal 1220 may be changed, the transmission terminal 1210 may transmit, to the reception terminal 1220 through a transmission configuration delivery message 1240, information indicating that transmission parameter configuration has been changed or reception parameter configuration information that the reception terminal 1220 needs to change. Thereafter, the reception terminal 1220 may change the reception parameter configuration, based on the transmission configuration delivery message 1240, and may apply a result of the change (operation 1250). The transmission parameter configuration 1230 and the reception parameter configuration 1250 may be achieved by one of the methods described above with reference to FIGS. 3 through 11.

Figure 13:
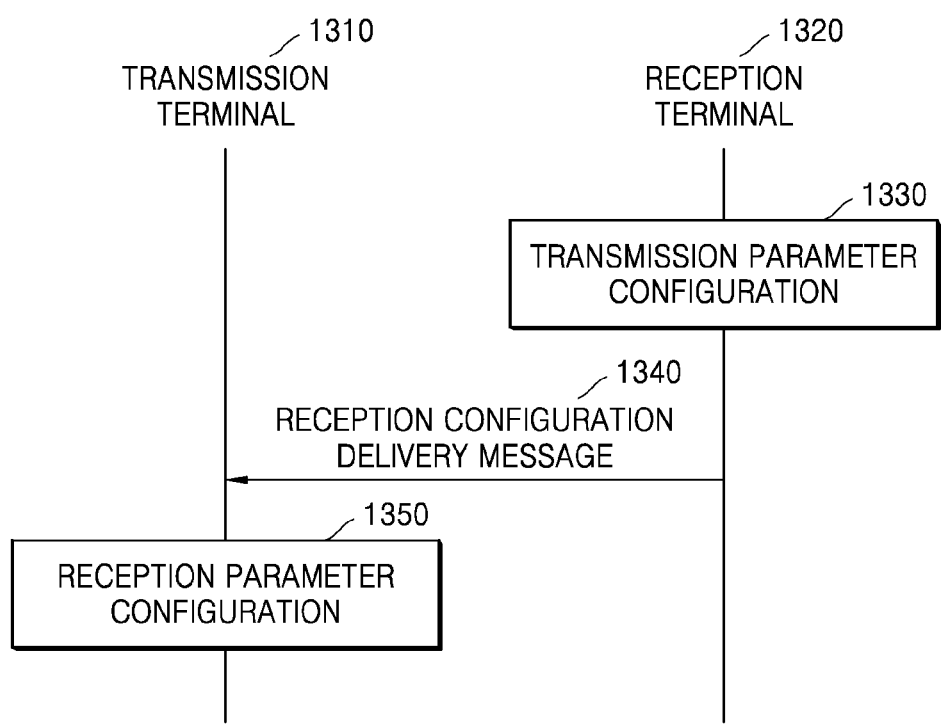
FIG. 13 is a flowchart of a procedure of applying a reconfiguration value of V2X communication or an SLRB, in a mobility scenario of a V2X communication terminal, according to an embodiment of the disclosure.

FIG. 13 is a flowchart of a procedure of applying a reconfiguration value of V2X communication or an SLRB, in a mobility scenario of a terminal of V2X communication, according to an embodiment of the disclosure.

A terminal having mobility is triggered to apply a new configuration, due to causes such as the terminal moving to the coverage of another base station or to an OOC region. The application of new configuration may be triggered in a transmission terminal 1310 or may be triggered in a reception terminal 1320. The embodiment of FIG. 13 illustrates a case where application of new configuration is triggered in the reception terminal 1320. When application of new configuration is trigged in the reception terminal 1320, the reception terminal 1320 applies configuration information of V2X communication or an SLRB included in an SIB or pre-configuration transmitted by a base station. The application of the configuration information may refer to configuration of a reception parameter value that the reception terminal 1320 is to apply (operation 1330). Thereafter, because parameter configuration of the transmission terminal 1310 may be changed, the reception terminal 1320 may transmit, to the transmission terminal 1310 through a reception configuration delivery message 1340, information 1330 indicating that reception parameter configuration has been changed or transmission parameter configuration information that the transmission terminal 1310 needs to change. Thereafter, the transmission terminal 1310 may change the transmission parameter configuration, based on the reception configuration delivery message 1340, and may apply a result of the change (operation 1350). The reception parameter configuration 1330 and the transmission parameter configuration 1350 may be achieved by one of the methods described above with reference to FIGS. 3 through 11.

Figure 14:
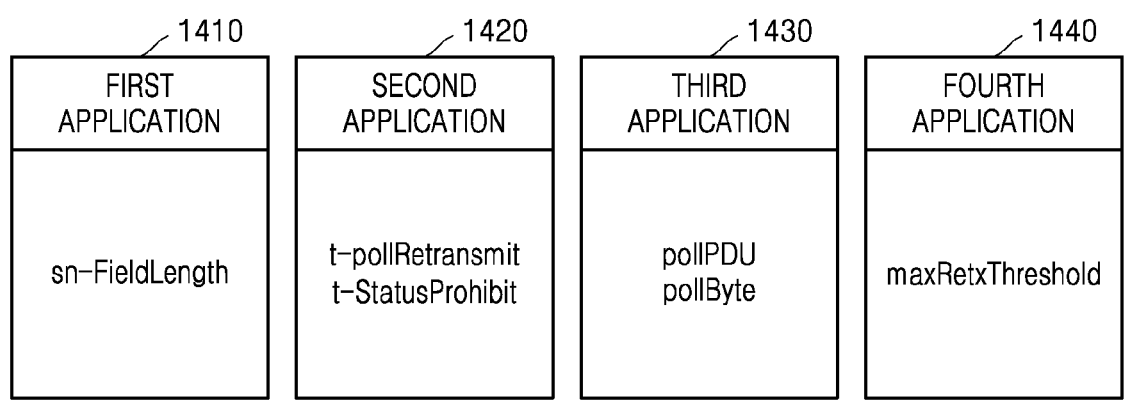
FIG. 14 illustrates different applications of each timer value and a constant value applied to a state variable, according to an embodiment of the disclosure.

FIG. 14 illustrates different applications of each timer value and a constant value applied to a state variable, according to an embodiment of the disclosure.

The disclosure proposes a method in which, as a terminal moves, configuration information of V2X communication or an SLRB is changed and applied. An application may differ according to each timer value and a constant value applied to a state variable, and may be achieved using one of the methods described above with reference to FIGS. 3 through 11. FIG. 14 illustrates an example in which one of four application methods may be used as an application of a timer value and a constant value that are applied to an RLC layer.

First application 1410 is a method of continuously applying a configuration value until a terminal is released, as described above with reference to FIGS. 3 and 4. According to the embodiment of FIG. 14, it is assumed that the first application 1410 is applied for sn-FieldLength that sets a sequence number length.

Second application 1420 is a method of applying a new configuration value (configuration of a second base station or pre-configuration that is to be used upon OOC) when the timer expires, restarts, or stops, and applying previous configuration (configuration of a first base station) before then, as described above with reference to FIGS. 5 and 6. According to the embodiment of FIG. 14, it is assumed that second application 1420 is applied for t-pollRetransmit and t-StatusProhibit.

Third application 1430 is a method of applying a new configuration value (configuration of a second base station or pre-configuration that is to be used upon OOC) when a state variable value that applies the constant value is reset or set as an initial value, and applying previous configuration (configuration of a first base station) before then, as described above with reference to FIGS. 5 and 7. According to the embodiment of FIG. 14, it is assumed that the third application 1430 is applied for pollPDU and pollByte.

Fourth application 1440 is a method of applying a new configuration value (configuration of a second base station or pre-configuration that is to be used upon OOC) at the moment when application of new configuration is triggered, and applying previous configuration (configuration of a first base station) before then, as described above with reference to FIGS. 8 through 11. According to the embodiment of FIG. 14, it is assumed that the fourth application 1440 is applied for maxRetxThreshold.

The embodiment of FIG. 14 illustrates that an application of each timer value and a constant value applied to a state variable may be achieved using different methods. In detail, a value to be applied and an application method to be used may vary according to embodiments.

Figure 15:
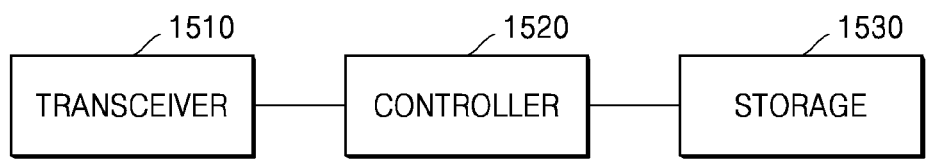
FIG. 15 is a block diagram of a structure of a base station according to an embodiment of the disclosure.

FIG. 15 is a block diagram of a structure of a base station according to an embodiment of the disclosure.

Referring to FIG. 15, the base station may include a transceiver 1510, a controller 1520, and a storage 1530. The disclosure is not limited thereto, and the base station may include more or less components than the components of FIG. 15. Furthermore, the transceiver 1510, the controller 1520, and the storage 1530 may be implemented as a single chip.

According to an embodiment of the disclosure, the controller 1520 may include a circuit, an application specific integrated circuit, or at least one processor. The disclosure is not limited thereto.

The transceiver 1510 may transmit or receive a signal to or from another network entity. For example, the transceiver 1510 may transmit system information to a terminal and may transmit a synchronization signal or a reference signal. The signal transmitted or received between the base station and the network entity may include control information and data. To this end, the transceiver 1510 may include a radio frequency (RF) transmitter that up-converts and amplifies the frequency of a signal to be transmitted, and an RF receiver that low-noise-amplifies a received signal and down-converts the frequency of the received signal. However, this is only an embodiment of the transceiver 1510, and the components of the transceiver 1510 are not limited to the RF transmitter and the RF receiver. The transceiver 1510 may receive a signal and output the signal to the controller 1520 through a wireless channel, and may transmit the signal output by the controller 1520 through a wireless channel.

The storage 1530 may store at least one of information transmitted and received by the transceiver 1510 or information generated by the controller 1520. The storage 1530 may store data and programs necessary for operations of the terminal. Furthermore, the storage 1530 may store control information or data included in a signal obtained by the terminal. The storage 1530 may include storage media, such as read-only memory (ROM), random access memory (RAM), a hard disk, compact disc (CD)-ROM, and a digital versatile disc (DVD), or a combination thereof. Furthermore, the storage 1530 may be composed of a plurality of memories.

The controller 1520 may control overall operations of the base station according to an embodiment of the disclosure. For example, the controller 1520 may control a signal flow between blocks so as to allow operations to be performed according to the aforementioned flowcharts. For example, the controller 1520 may determine whether the terminal exists in the coverage of the base station. When it is determined that the terminal exists in the coverage of the base station, the controller 1520 may apply a predetermined configuration value to the terminal. When it is determined that the terminal exists in the coverage of another base station, the controller 1520 may continuously apply the configuration value to the terminal until the terminal is released. Only some operations among the aforementioned embodiments have been illustrated, but the disclosure is not limited thereto. The controller 1520 may control all processes such that the terminal may operate according to all or some of the aforementioned embodiments.

Figure 16:
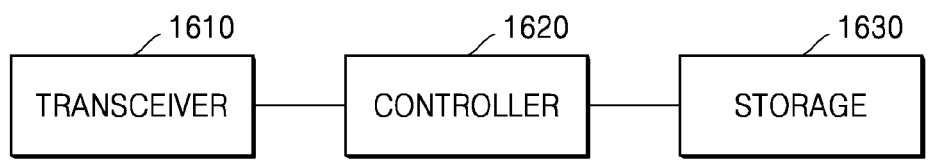
FIG. 16 is a block diagram of a structure of a terminal according to an embodiment of the disclosure.

FIG. 16 is a block diagram of a structure of a terminal according to an embodiment of the disclosure.

Referring to FIG. 16, the terminal may include a transceiver 1610, a controller 1620, and a storage 1630. The disclosure is not limited thereto, and the terminal may include more or less components than the components of FIG. 16. Furthermore, the transceiver 1610, the controller 1620, and the storage 1630 may be implemented as a single chip.

According to an embodiment of the disclosure, the controller 1620 may include a circuit, an application specific integrated circuit, or at least one processor. The disclosure is not limited thereto.

According to an embodiment of the disclosure, the controller 1620 may control a series of processes so that the terminal may operate according to the above-described embodiment. According to an embodiment, when the terminal exists in the coverage of a base station, the controller 1620 may receive a predetermined configuration value from the base station and may apply the received configuration value. When the terminal has moved to the coverage of another base station, the controller 1620 may apply the previously-received configuration value until the terminal is released. Only some operations among the aforementioned embodiments have been illustrated, but the disclosure is not limited thereto. The controller 1620 may control all processes such that the terminal may operate according to all or some of the aforementioned embodiments.

The transceiver 1610 may transmit or receive a signal to or from another network entity. For example, the transceiver 1610 may receive system information from the base station and may receive a synchronization signal or a reference signal. The signal transmitted or received between the base station and the network entity may include control information and data. To this end, the transceiver 1610 may include an RF transmitter that up-converts and amplifies the frequency of a signal to be transmitted, and an RF receiver that low-noise-amplifies a received signal and down-converts the frequency of the received signal. However, this is only an embodiment of the transceiver 1610, and the components of the transceiver 1610 are not limited to the RF transmitter and the RF receiver. The transceiver 1610 may receive a signal and output the signal to the controller 1620 through a wireless channel, and may transmit the signal output by the controller 1620 through a wireless channel.

The storage 1630 may store at least one of information transmitted and received by the transceiver 1610 or information generated by the controller 1620. The storage 1630 may store data and programs necessary for operations of the terminal. Furthermore, the storage 1630 may store control information or data included in a signal obtained by the terminal. The storage 1630 may include storage media, such as ROM, RAM, a hard disk, CD-ROM, and a DVD, or a combination thereof. Furthermore, the storage 1630 may be composed of a plurality of memories.

Provided is a method and apparatus capable of effectively providing services in a wireless communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a terminal, of performing vehicle-to-everything (V2X) communication, the method comprising:
    applying, to a sidelink radio bearer, first configuration information;
    receiving second configuration information according to a movement of the terminal;
    determining a time point at which the second configuration information is to be applied; and changing, based on the time point and the second configuration information, a configuration of the sidelink radio bearer.

2. The method of claim 1, wherein the time point is a time point at which a maximum retransmission threshold (maxRetxThreshold) included in the first configuration information is changed to a maxRetxThreshold included in the second configuration information.

3. The method of claim 2, further comprising:
retransmitting, based on the first configuration information, one or more radio link control protocol data units (RLC PDUs); and
in case that a number of retransmissions of the one or more RLC PDUs is greater than or equal to the maxRetxThreshold included in the second configuration information, reporting, to a higher layer, the determined time point.

4. The method of claim 1, wherein the time point is a time point at which a service data association protocol (SDAP) layer, a packet data convergence protocol (PDCP) layer, a radio link control (RLC) layer, or a medium access control (MAC) layer is released.

5. The method of claim 4, wherein the changing of the configuration of the sidelink radio bearer further comprises changing a configuration associated with a length of a sequence number at the time point.

6. The method of claim 1,
wherein the time point is a time point at which a timer expires, restarts, or stops, and wherein the timer is at least one of a reordering timer, a reassembly timer, or poll retransmit timer.

7. The method of claim 1,
wherein the time point is a time point at which a state variable value is reset or changed to an initial value, and
wherein the state variable value is associated with a pollPDU or pollByte.

8. The method of claim 1, further comprising transmitting, to another terminal, information indicating that the configuration of the sidelink radio bearer has been changed.

9. A terminal for performing vehicle-to-everything (V2X) communication, the terminal comprising:
a transceiver; and
at least one processor connected with the transceiver and configured to
apply, to a sidelink radio bearer, first configuration information,
receive second configuration information according to a movement of the terminal,
determine a time point at which the second configuration information is to be applied, and
change, based on the time point and the second configuration information, a configuration of the sidelink radio bearer.

10. The terminal of claim 9, wherein the time point is a time point at which a maximum retransmission threshold (maxRetxThreshold) included in the first configuration information is changed to a maxRetxThreshold included in the second configuration information.

11. The terminal of claim 10, wherein the at least one processor is further configured to:
retransmit, based on the first configuration information, one or more radio link control protocol data units (RLC PDUs); and
in case that a number of retransmissions of the one or more RLC PDUs is greater than or equal to the maxRetxThreshold included in the second configuration information, reporting, to a higher layer, the determined time point.

12. The terminal of claim 9, wherein the time point is a time point at which a service data association protocol (SDAP) layer, a packet data convergence protocol layer, a radio link control (RLC) layer, or a medium access control (MAC) layer is released.

13. The terminal of claim 12, wherein the at least one processor is further configured to change a configuration associated with a length of a sequence number at the time point.

14. The terminal of claim 9,
wherein the time point is a time point at which a timer expires, restarts, or stops, and
wherein the timer is at least one of a reordering timer, a reassembly timer, or poll retransmit timer.

15. The terminal of claim 9,
wherein the time point is a time point at which a state variable value is reset or changed to an initial value, and
wherein the state variable value is associated with a pollPDU or pollByte.

16. The terminal of claim 9, wherein the at least one processor is further configured to transmit, to another terminal, information indicating that the configuration of the sidelink radio bearer has been changed.

* * * * *